(No Model.)
C. COPMAN.
FILLING ATTACHMENT FOR THE HUBS OF PIPES.
No. 315,483. Patented Apr. 14, 1885.
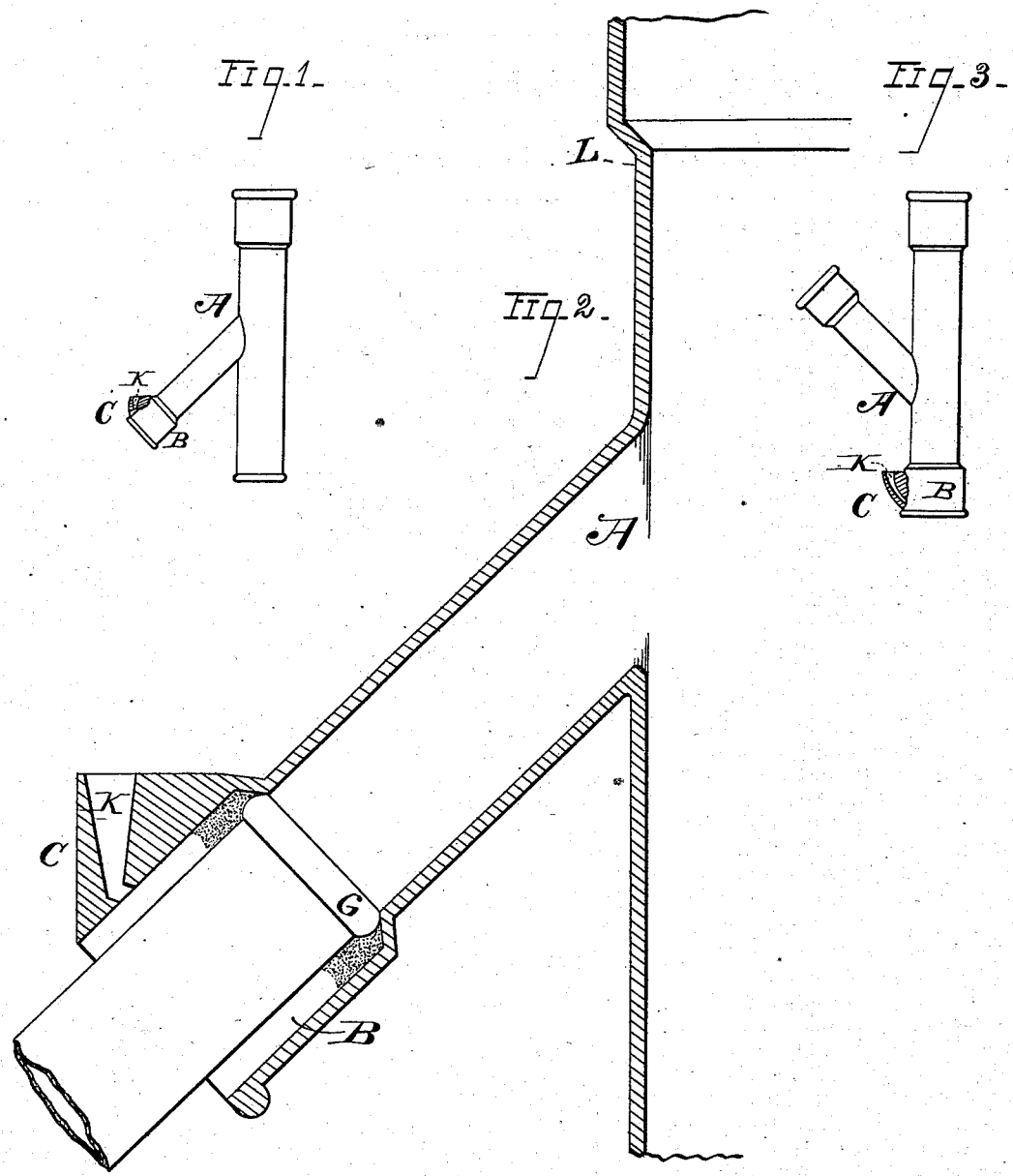
WITNESSES:
INVENTOR
Charles Copman,
BY
ATTORNEY

UNITED STATES PATENT OFFICE.

CHARLES COPMAN, OF NEW YORK, N. Y.

FILLING ATTACHMENT FOR THE HUBS OF PIPES.

SPECIFICATION forming part of Letters Patent No. 315,483, dated April 14, 1885.

Application filed February 29, 1884. (No model.)

*To all whom it may concern:*

Be it known that I, CHARLES COPMAN, a citizen of the United States, and a resident of New York, in the county and State of New York, have invented a new and useful Improvement in Pipes, of which the following is a full, complete, and exact specification, reference being had to the annexed drawings, which form a part thereof.

My invention relates to an improvement in pipes; and it consists in providing means for the employment of a pipe running perpendicularly and furnished with a downwardly-turned hub in connection with a pipe without a hub.

In the drawings, Figures I and III are side elevations of my invention; and Fig. II is a sectional view of the downwardly-turned hub.

In the use of air-pipes in houses to draw off the back-pressure of the sewer-trap and sewer, the connection between the air-pipe and the sewer-trap is generally made by means of a T-branch pipe and a one-eighth or one-fourth bend connecting with a ferrule, and the pipe extending from the trap of the waste-pipe; but the difficulty experienced in the use of this device is that the current of air is, as it were, broken almost at right angles by the bend in the pipe, and consequently the air becomes frequently stagnated. This difficulty can be obviated by the use of a pipe running perpendicularly instead of the one-eighth and one-fourth bend, and the joint can be made perfect while the pipes are in position, provided the pipe is supplied with a downwardly-turned hub and my means for filling the same with lead.

In the drawings, A indicates what is commonly known as a "Y-branch" pipe, provided with the downwardly-turned hub B. On this hub is cast or otherwise secured the lip C in a direction diagonal to the plane of the hub, and through which extends, to the interior of the same, the aperture or canal K.

The joint is completed in the following manner: When the air-pipes L are put into a house supplied with pipes running in a perpendicular direction, and having attached to their downwardly-turned hubs the lip C, the ferrule G, which extends from the waste-pipe, is then inserted in the interior of the hub B, as shown in Fig. II. A band of fire-clay or putty is placed around the lower portion of the hub and the ferrule. The joint is then completed by pouring through the aperture K of the lip C into the interior of the hub B molten lead, which fills up tightly and securely the interstices between the sides of the hub and the ferrule.

By means of this device I am able to maintain a direct current between the sewer-trap and air-pipes, and the connection between these two can be made before the rest of the fixtures are put into a building.

What I claim as new, and desire to secure by Letters Patent, is—

A section of pipe provided on one end with the hub B, opening downwardly, the lip C being secured in a direction diagonal to the plane of the hub, and upwardly-inclined aperture K, leading to the interior of the same in connection with a section of pipe having one end adapted to enter said hub, substantially in the manner described, and for the purposes set forth.

CHARLES COPMAN.

Witnesses:
 DANL. L. DODGE,
 MEYER BUTZEL.